(12) United States Patent
Kogashi

(10) Patent No.: US 12,459,880 B2
(45) Date of Patent: Nov. 4, 2025

(54) HALON PURIFICATION METHOD

(71) Applicant: SHOWA DENKO K. K., Tokyo (JP)

(72) Inventor: Kanako Kogashi, Tokyo (JP)

(73) Assignee: Resonac Corporation, Tokyo (JP)

( * ) Notice: Subject to any disclaimer, the term of this patent is extended or adjusted under 35 U.S.C. 154(b) by 508 days.

(21) Appl. No.: 18/011,416

(22) PCT Filed: Jul. 16, 2021

(86) PCT No.: PCT/JP2021/026842
§ 371 (c)(1),
(2) Date: Dec. 19, 2022

(87) PCT Pub. No.: WO2022/044613
PCT Pub. Date: Mar. 3, 2022

(65) Prior Publication Data
US 2023/0322650 A1 Oct. 12, 2023

(30) Foreign Application Priority Data
Aug. 24, 2020 (JP) ................. 2020-140977

(51) Int. Cl.
*C07C 17/38* (2006.01)
*B01D 53/14* (2006.01)

(52) U.S. Cl.
CPC .......... *C07C 17/38* (2013.01); *B01D 53/1493* (2013.01); *B01D 2251/304* (2013.01);
(Continued)

(58) Field of Classification Search
CPC ..... C07C 17/38; C07C 19/14; B01D 53/1493; B01D 2251/304; B01D 2251/306; B01D 2257/2022; B01D 53/14; B01D 53/1487
See application file for complete search history.

(56) References Cited

U.S. PATENT DOCUMENTS 5,444,102 A 8/1995 Nimitz et al.
5,457,267 A 10/1995 Jansen et al.
(Continued)

FOREIGN PATENT DOCUMENTS

CA 2128659 A1 1/1995
CN 1122606 A 5/1996
(Continued)

OTHER PUBLICATIONS

Takao Matsuoka et al., "Reaction Rates of Bromine from Air in Alkaline Solutions", Scientific report of Toyo Soda Manufacturing Company, Ltd., 1960, pp. 26-32, 4(1).
(Continued)

*Primary Examiner* — Jafar F Parsa
(74) *Attorney, Agent, or Firm* — Sughrue Mion, PLLC

(57) ABSTRACT

There is provided a halon purification method capable of simply, safely, and efficiently removing mixed bromine molecules to obtain high purity halon. The halon purification method is a method for removing bromine molecules from crude halon containing halon and the bromine molecules, and the method includes: a contact step of bringing the crude halon into contact with an absorbing liquid containing an aqueous solution containing metal iodide to obtain a mixed liquid containing the crude halon and the absorbing liquid; and a separation step of separating the halon from the mixed liquid to obtain the halon and the absorbing liquid having absorbed the bromine molecules.

20 Claims, 1 Drawing Sheet

(52) U.S. Cl.
CPC .... *B01D 2251/306* (2013.01); *B01D 2256/26* (2013.01); *B01D 2257/2022* (2013.01)

(56) References Cited

U.S. PATENT DOCUMENTS

| | | |
|---|---|---|
| 2016/0096731 A1 | 4/2016 | Soppe et al. |
| 2018/0112016 A1 | 4/2018 | Kato et al. |
| 2018/0186633 A1 | 7/2018 | Soppe et al. |
| 2022/0054972 A1 | 2/2022 | Suzuki et al. |

FOREIGN PATENT DOCUMENTS

| | | | |
|---|---|---|---|
| CN | 103407965 | A | 11/2013 |
| CN | 107709374 | A | 2/2018 |
| JP | 02-280815 | A | 11/1990 |
| JP | 6-48703 | A | 2/1994 |
| JP | 7-178313 | A | 7/1995 |
| JP | 09-262565 | A | 10/1997 |
| JP | 2788477 | B2 | 8/1998 |
| JP | 2000-167342 | A | 6/2000 |
| JP | 2016-523695 | A | 8/2016 |
| WO | 2020/129726 | A1 | 6/2020 |

OTHER PUBLICATIONS

International Search Report for PCT/JP2021/026842, dated Sep. 28, 2021.

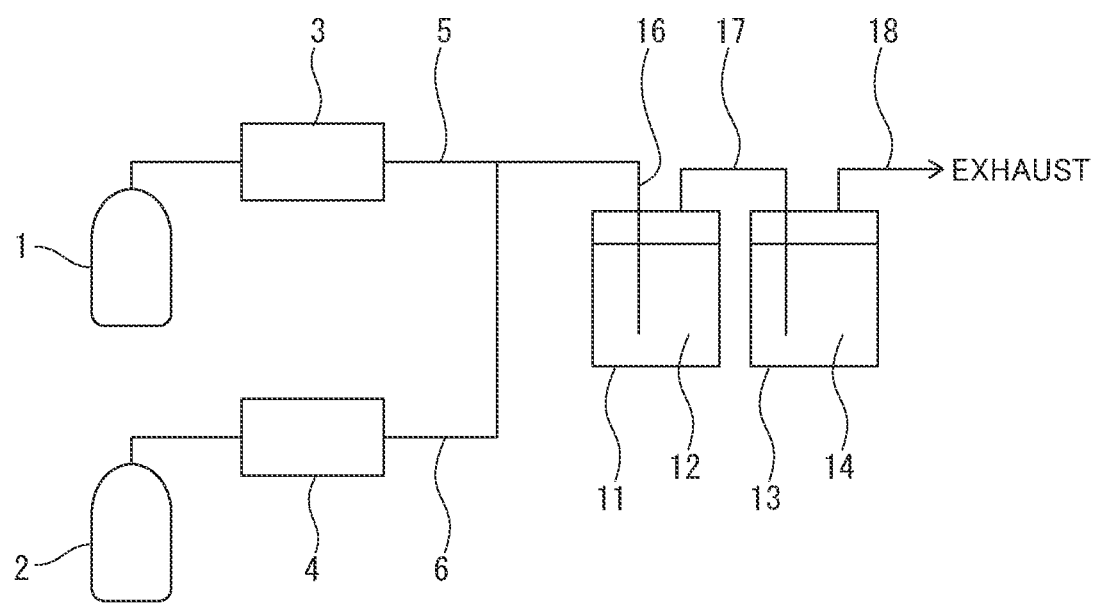

HALON PURIFICATION METHOD

CROSS REFERENCE TO RELATED APPLICATIONS

This application is a National Stage of International Application No. PCT/JP2021/026842 filed Jul. 16, 2021, claiming priority based on Japanese Patent Application No. 2020-140977 filed Aug. 24, 2020.

TECHNICAL FIELD

The present invention relates to a halon purification method.

BACKGROUND ART

Halons are compounds utilized as fire extinguishing agents, refrigerants, synthetic reagents, and the like. The halons refer to, among halogenated hydrocarbons in which some or all of hydrogen atoms of saturated hydrocarbons or unsaturated hydrocarbons are replaced by halogen atoms, halogenated hydrocarbons in which some or all of the halogen atoms replacing the hydrogen atoms are bromine atoms.

The bromine molecules are sometimes mixed as impurities in the halon due to its synthesis process or thermal decomposition, but the bromine molecules are corrosive or toxic, and thus are preferably removed from the halons.

As a method for removing the bromine molecules from the halon for purification, a distillation method is generally used.

As another method for removing the bromine molecules from the halon for purification, a liquid phase extraction method is mentioned which includes bringing the halon into contact with an absorbing liquid for the absorption of the bromine molecules into the absorbing liquid. PTL 1 has proposed a technology of using an aqueous organic base solution as the absorbing liquid. PTL 2 has proposed a technology of using an aqueous solution of metal sulfites and metal hydroxides as the absorbing liquid.

CITATION LIST

Patent Literatures

PTL 1: JP 2000-167342 A
PTL 2: JP 2788477 B

SUMMARY OF INVENTION

Technical Problem

However, the distillation method requires large-scale equipment, such as a distillation tower, which has posed a problem of difficulty of simply purifying the halons. Further, the halons and the bromine molecules sometimes have similar boiling points, which has sometimes made it difficult to obtain high purity halons.

Further, the liquid phase extraction method is a method excellent in the treatment amount and the cost. However, the absorbing liquids used in the technologies of PTLS 1, 2 are alkaline solutions, and therefore the method has posed a problem that there is a risk of danger in handling. Further, the use of the alkaline solution as the absorbing liquid has posed a risk that the removal efficiency of the bromine molecules is insufficient and has posed a risk that the halons are hydrolyzed by the alkaline solution.

It is an object of the present invention to provide a halon purification method capable of simply, safely, and efficiently removing mixed bromine molecules to obtain high purity halon.

Solution to Problem

To achieve the above-described object, one aspect of the present invention is as described in [1] to [8] below.

[1] A halon purification method for removing bromine molecules from crude halon containing halon and the bromine molecules, and the method includes: a contact step of bringing the crude halon into contact with an absorbing liquid containing an aqueous solution containing metal iodide to obtain a mixed liquid containing the crude halon and the absorbing liquid; and a separation step of separating the halon from the mixed liquid to obtain the halon and the absorbing liquid having absorbed the bromine molecules.

[2] The halon purification method according to [1], in which the metal iodide is at least one selected from alkali metal iodides and alkaline earth metal iodides.

[3] The halon purification method described in [1], in which the metal iodide is potassium iodide.

[4] The halon purification method according to any one of [1] to [3], in which the crude halon in a gaseous state is brought into contact with the absorbing liquid in the contact step and the halon in a gaseous state is extracted from the mixed liquid by gas-liquid extraction in the separation step.

[5] The halon purification method according to any one of [1] to [4], in which the number of carbons of the halon is 1 or more and 3 or less.

[6] The halon purification method according to any one of [1] to [4], in which the number of carbons of halon is 1 or 2.

[7] The halon purification method according to any one of [1] to [4], in which the halon is at least one of bromomethane, tribromofluoromethane, bromodifluoromethane, dibromodifluoromethane, bromotrifluoromethane, bromoethane, dibromotrifluoroethane, dibromotetrafluoroethane, tribromotrifluoroethane, bromofluoroethylene, bromodifluoroethylene, and bromotrifluoroethylene.

[8] The halon purification method according to any one of [1] to [7], in which the absorbing liquid further contains potassium iodate or sodium iodate.

Advantageous Effects of Invention

The present invention can simply, safely, and efficiently remove the bromine molecules mixed in halon to obtain high purity halon.

BRIEF DESCRIPTION OF DRAWINGS

The FIGURE is a schematic view illustrating one example of purification treatment equipment for explaining one embodiment of a halon purification method according to the present invention.

DESCRIPTION OF EMBODIMENTS

Hereinafter, one embodiment of the present invention will be described. This embodiment describes one example of the present invention, and the present invention is not limited to this embodiment. Further, this embodiment can be variously altered or modified and embodiments obtained by such alternations or modifications may also be included in the present invention.

A halon purification method according to one embodiment of the present invention is a halon purification method for removing bromine molecules from crude halon containing halon and the bromine molecules, and the method includes: a contact step of bringing the crude halon into contact with an absorbing liquid containing an aqueous solution containing metal iodide to obtain a mixed liquid containing the crude halon and the absorbing liquid; and a separation step of separating the halon from the mixed liquid to obtain the halon and the absorbing liquid having absorbed the bromine molecules.

The bromine molecules are sometimes mixed as impurities in the halon. However, when the crude halon containing the halon and the bromine molecules is purified by the halon purification method according to this embodiment, the bromine molecules mixed in the crude halon can be simply, safely, and efficiently removed, so that high purity purified halon is obtained.

In detail, the halon purification method according to this embodiment does not use a distillation method, and therefore can simply obtain high purity purified halon without requiring large-scale equipment, such as a distillation tower. The purification is performed not by the distillation method but by a liquid-phase extraction method. Therefore, even when the halon has a boiling point similar to that of the bromine molecules, high purity purified halon can be obtained. Further, an alkaline solution is not required as the absorbing liquid and the aqueous solution containing metal iodide is used as the absorbing liquid, and therefore high safety is achieved and the operation is easy. Further, the halon does not contact the alkaline solution and the halon is hard to be susceptible to hydrolysis, and therefore the bromine molecules are effectively removed from the crude halon, so that high purity purified halon can be obtained.

The halon purification method according to this embodiment is described in more detail below.

[Crude Halon]

The type of the halon capable of being purified by the halon purification method according to this embodiment is not particularly limited and is preferably halon having low water solubility and a low boiling point considering easiness of the separation when the halon is separated from the mixed liquid in the separation step. More specifically, halons having the number of carbons of 1 or more and 3 or less are preferable and halons having the number of carbons of 1 or 2 are more preferable.

Specifically, the halon is further preferably at least one of bromomethane ($CH_3Br$), tribromofluoromethane ($CBr_3F$), bromodifluoromethane ($CHBrF_2$), dibromodifluoromethane ($CBr_2F_2$), bromotrifluoromethane ($CBrF_3$), bromoethane ($C_2H_5Br$), dibromotrifluoroethane ($C_2HBr_2F_3$), dibromotetrafluoroethane ($C_2Br_2F_4$), tribromotrifluoroethane ($C_2Br_3F_3$), bromofluoroethylene ($C_2H_2BrF$), bromodifluoroethylene ($C_2HBrF_2$), bromotrifluoroethylene ($C_2BrF_3$), bromohexafluoropropane ($C_3HBrF_6$), bromoheptafluoropropane ($C_3BrF_7$), and bromotrifluoropropene ($C_3H_2BrF_3$).

The crude halon used in the halon purification method according to this embodiment can be either in a gaseous state or a liquid state. Gas-liquid separation is suitable for halons having low boiling points, such as dibromodifluoromethane, bromotrifluoroethylene, bromohexafluoropropane, bromoheptafluoropropane, and bromotrifluoropropene. Liquid-liquid separation is suitable for halons having high boiling points, such as tribromofluoromethane and tribromotrifluoroethane.

The halon purification method according to this embodiment can also purify crude halon containing one type of halon or can purify crude halon containing two or more types of halons.

The concentration of the bromine molecules in the crude halon is not particularly limited. Considering increasing the removal rate of the bromine molecules from the crude halon, the number of moles of the bromine molecules in the crude halon is preferably 1 time or less, more preferably 0.8 time or less, and still more preferably 0.5 time or less the number of moles of the halon in the crude halon. To set the concentration of the bromine molecules in the purified halon to a concentration at which the corrosiveness due to the bromine molecules is sufficiently low, the concentration of the bromine molecules in the purified halon is preferably 0.1% by volume or less. To achieve the concentration, the removal rate of the bromine molecules from the crude halon is preferably 99.90% or more.

When the crude halon contains hydrogen bromide, the concentration of the hydrogen bromide in the crude halon is not particularly limited. Considering increasing the removal rate of the hydrogen bromide from the crude halon, the number of moles of the hydrogen bromide in the crude halon is preferably 1.5 times or less, more preferably 1 time or less, and still more preferably 0.5 time or less the number of moles of the halon in the crude halon.

[Absorbing Liquid]

The absorbing liquid is not particularly limited insofar as it is a liquid capable of absorbing the bromine molecules and is an aqueous solution containing metal iodide. From the viewpoint of high safety, ease of handling, and suppression of hydrolysis of the halon, the liquidity of the absorbing liquid is preferably neutral rather than alkaline or acidic and the pH thereof may be 5 or more and 9 or less and is more preferably 6 or more and 8 or less. Therefore, the absorbing liquid needs to be an aqueous solution of metal iodide, which is a reducing agent, but is preferably an aqueous solution in which only metal iodide is dissolved in water, and it is preferable that basic compounds, such as hydroxides, are not dissolved. However, when the liquidity of the absorbing liquid is kept neutral, the absorbing liquid may contain other compounds, such as additives.

The type of the metal iodide is not particularly limited and is preferably at least one selected from alkali metal iodides and alkaline earth metal iodides. Specific examples of the alkali metal iodides include potassium iodide (KI) and sodium iodide (NaI). Specific examples of the alkaline earth metal iodides include magnesium iodide ($MgI_2$), calcium iodide ($CaI_2$), and barium iodide ($BaI_2$). Among these metal iodides, potassium iodide is particularly preferable.

The amount of the metal iodide contained in the absorbing liquid is preferably equal to or larger than an amount at which the entire amount of the bromine molecules to be absorbed by the absorbing liquid can be absorbed, i.e., 1 time or more the equivalent required for a reaction with the bromine molecules. To improve the removal rate of the bromine molecules from the crude halon, the amount of the metal iodide is more preferably set to 1.5 times or more, more preferably twice or more, and 5 times or more the equivalent above.

The concentration of the metal iodide in the absorbing liquid is preferably a concentration at which the metal iodide can be dissolved and a concentration at which metal bromide and iodine molecules generated by the reaction can be dissolved in the absorbing liquid. However, the concentration of the metal iodide in the absorbing liquid may be such that at least some of the metal iodides are insoluble, i.e., the absorbing liquid may be a slurry in which metal iodide in a solid state is mixed. Therefore, the concentration of the metal iodide in the absorbing liquid is preferably 0.1 mol/L or more and 9 mol/L or less.

When the metal iodide in the absorbing liquid is consumed by the absorption of the bromine molecules, so that the concentration of the metal iodide decreases, the iodine molecules generated by the reaction are difficult to dissolve in the absorbing liquid. As a result, the iodine molecules are deposited from the absorbing liquid, which poses a risk of causing clogging of members (for example, piping) of purification treatment equipment.

Therefore, the concentration of the metal iodide in the absorbing liquid during a purification treatment period is preferably maintained at 40% or more and is more preferably maintained at 60% or more of the concentration of the metal iodide in the initial absorbing liquid before the purification treatment. More specifically, during the purification treatment period, the concentration of the metal iodide of the absorbing liquid is preferably maintained at 0.5 mol/L or more and more preferably maintained at 0.7 mol/L or more.

When the crude halon contains substances that seem to react with the metal iodide (for example, hydrogen bromide (HBr) described later) besides the bromine molecules, it is preferable to determine the amount of the metal iodide contained in the absorbing liquid considering the amount of the substances other than the bromine molecules. More specifically, the amount of the metal iodide contained in the absorbing liquid is preferably set to 1 time or more, more preferably set to 1.5 times or more, still more preferably set to twice or more, and yet still more preferably set to 5 times or more the total equivalent of the equivalent required for the reaction with the bromine molecules and the equivalent required for the reaction with the substances other than the bromine molecules.

Any additive may be dissolved or suspended as desired in the absorbing liquid. For example, when the crude halon contains hydrogen bromide, the addition of potassium iodate ($KIO_3$) or sodium iodate ($NaIO_3$) as the additives to the absorbing liquid enables the removal of the hydrogen bromide together with the bromine molecules from the crude halon.

The hydrogen bromide is removed from the crude halon by a reaction represented by Reaction Formula (2) below.

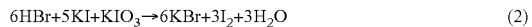

$$6HBr+5KI+KIO_3 \rightarrow 6KBr+3I_2+3H_2O \quad (2)$$

The amount of the additive, which is potassium iodate or sodium iodate, for example, contained in the absorbing liquid is preferably set to an amount at which the entire amount of hydrogen bromide to be absorbed into the absorbing liquid can be absorbed, i.e., 1 time or more the equivalent required for a reaction with the hydrogen bromide. To improve the removal rate of the hydrogen bromide from the crude halon, the amount of the additive is more preferably set to 1.5 times or more, more preferably set to 3 times or more, and particularly preferably set to 7 times or more the equivalent above.

When a plurality of absorbing towers is used in the absorption step, the amount of the additives contained in the absorbing liquid is preferably applied to the absorbing liquid housed in the absorbing tower on the most upstream side among the plurality of absorbing towers connected in series.

[Contact Step]

The contact step is a step of bringing the crude halon into contact with the absorbing liquid to obtain a mixed liquid containing the crude halon and the absorbing liquid and causing the absorbing liquid to absorb the bromine molecules in the crude halon. The halon purification method according to this embodiment can purify crude halon in a gaseous state and can purify crude halon in a liquid state.

A method for bringing the crude halon into contact with the absorbing liquid is not particularly limited. When the crude halon is in a liquid state, the crude halon can be brought into contact with the absorbing liquid by a method for mixing the crude halon in the absorbing liquid in the absorbing tower, for example, and dispersing the crude halon in the liquid. When the crude halon is in a liquid state, the crude halon can be transferred by a liquid feed pump.

When the crude halon is in a gaseous state, the crude halon can be brought into contact with the absorbing liquid by a method for bubbling the crude halon into the absorbing liquid, a method for spraying the absorbing liquid to the crude halon with a scrubber, or the like. When the crude halon is in a gaseous state, the absorbing liquid is brought into contact with the crude halon in a gaseous state in the contact step and the crude halon in a gaseous state is extracted from the mixed liquid by gas-liquid extraction in the separation step, and therefore the purification operation is simple and easy.

Specific examples of the bubbling method include a method for supplying the crude halon into the absorption liquid housed in the absorbing tower. When the crude halon is brown into the absorbing liquid via piping or the like inserted into the absorbing liquid, the crude halon can be brought into contact with the absorbing liquid. By blowing the crude halon into the absorbing liquid, a mixed liquid containing the crude halon and the absorbing liquid is obtained, and the bromine molecules in the crude halon and the metal iodide in the absorbing liquid react with each other, so that the bromine molecules are absorbed into the absorbing liquid.

For example, when potassium iodide is used as the metal iodide, the bromine molecules are removed from the crude halon by a reaction represented by Reaction Formula (1) below.

$$Br_2+2KI \rightarrow 2KBr+I_2 \quad (1)$$

The metal bromide and the iodine molecules ($I_2$) generated by the reaction remain in the absorbing liquid, and the halon is separated from the absorbing liquid in the separation step because the halon is poorly soluble in water.

The number of the absorbing towers is not particularly limited and may be one or two or more. To improve the removal rate of the bromine molecules from the crude halon, it is preferable to adopt an aspect in which a plurality of absorbing towers is connected in series and the crude halon is continuously blown into the plurality of absorbing towers. When the plurality of absorbing towers is used, the "amount of the metal iodide contained in the absorbing liquid" described in the section "Absorbing liquid" above is preferably applied to the absorbing liquid housed in the absorbing tower on the most upstream side of the plurality of absorbing towers connected in series.

The piping inserted into the absorbing liquid and the absorbing towers are preferably formed of materials less likely to react with the bromine molecules and the halon. Examples of such materials include fluororesins, glass, and the like, for example.

When the absorbing liquid after used in the purification of the crude halon is disposed, the iodine molecules generated by the reaction of the metal iodide and the bromine molecules is treated with sodium thiosulphate ($Na_2S_2O_3$) or the like before the disposal.

When the crude halon in a gaseous state is purified, the crude halon may be made into a gaseous state by the vapor pressure of the halon or may be made into a gaseous state by mixing a dilution gas, such as an inert gas. When the dilution gas is mixed in the crude halon, the dilution gas may be mixed such that 10% by volume or more and 90% by volume or less of a gaseous mixture obtained by mixing the crude halon and the dilution gas is formed of the dilution gas, for example.

The type of the inert gas to be used as the dilution gas is not particularly limited and a nitrogen gas ($N_2$), helium (He), argon (Ar), neon (Ne), krypton (Kr), and xenon (Xe) are mentioned, for example. Among these inert gases, a nitrogen gas, helium, argon, neon, and krypton are preferable and a nitrogen gas and argon are more preferable. These inert gases may be used alone or in combination of two or more type thereof.

[Separation Step]

The separation step is a step of separating the halon from the mixed liquid containing the crude halon and the absorbing liquid to obtain the purified halon and the absorbing liquid having absorbed the bromine molecules. Since the halon is poorly soluble in water, the halon is separated from the absorbing liquid by the gas-liquid separation or the liquid-liquid separation due to a specific gravity difference.

A method for separating the halon from the mixed liquid is not particularly limited. When the halon is in a gaseous state, the purified halon is separated from the absorbing liquid by the gas-liquid separation and is discharged from the absorbing tower through piping provided at the top of the absorbing tower, for example. When the halon is in a liquid state, the purified halon is separated from the absorbing liquid by the liquid-liquid separation. When the specific gravity of the halon is smaller than that of the absorbing liquid, the purified halon is discharged from the absorbing tower through the piping provided at the top of the absorbing tower, for example. When the specific gravity of the halon is larger than that of the absorbing liquid, the purified liquid is discharged from the absorbing tower through piping provided at the bottom of the absorbing tower, for example.

[Purification Treatment Equipment]

Next, one example of the configuration of purification treatment equipment capable of implementing the halon purification method according to this embodiment and one example of the halon purification method using the purification treatment equipment are described with reference to the FIGURE.

The purification treatment equipment in the FIGURE includes a crude halon cylinder 1 filled with crude halon in a gaseous state at normal temperature and normal pressure, an inert gas cylinder 2 filled with an inert gas, a first absorbing tower 11 and a second absorbing tower 13 purifying the crude halon, crude halon supply piping 5 connecting the crude halon cylinder 1 and the first absorbing tower 11, and inert gas supply piping 6 connecting the inert gas cylinder 2 to an intermediate part of the crude halon supply piping 5.

A crude halon supply unit 3 containing a mass flow controller and the like is provided in an upstream side portion (i.e., a portion close to the crude halon cylinder 1) of the crude halon supply piping 5. Crude halon of the crude halon cylinder 1 is supplied to the first absorbing tower 11 via the crude halon supply piping 5 while the flow rate is controlled by the crude halon supply unit 3.

The inert gas supply piping 6 is provided with an inert gas supply unit 4 containing a mass flow controller and the like. The inert gas of the inert gas cylinder 2 is supplied to the intermediate part (a downstream side portion relative to the crude halon supply unit 3) of the crude halon supply piping 5 via the inert gas supply piping 6 while the flow rate is controlled by the inert gas supply unit 4.

When the crude halon in a gaseous state is diluted with the inert gas, the crude halon gas is sent to the crude halon supply piping 5 by the crude halon supply unit 3 and the inert gas is sent to the crude halon supply piping 5 via the inert gas supply piping 6 by the inert gas supply unit 4. Thus, the crude halon gas is diluted by the inert gas in the intermediate part of the crude halon supply piping 5. The diluted crude halon gas is supplied to the first absorbing tower 11 via the crude halon supply piping 5.

The first absorbing tower 11 houses a first absorbing liquid 12, and a bubbling pipe 16 connected to a downstream side end part of the crude halon supply piping 5 is inserted into the first absorbing liquid 12. Thus, the crude halon is supplied into the first absorbing liquid 12 of the first absorbing tower 11 and contacts the first absorbing liquid 12. Therefore, the purification treatment of the crude halon is performed in the first absorbing tower 11. The first absorbing tower 11 is provided with a temperature control device (not illustrated) controlling the temperature of the first absorbing liquid 12.

The crude halon which has been subjected to the purification treatment in the first absorbing tower 11 and from which most of the contained bromine molecules have been removed is separated from the first absorbing liquid 12 by the gas-liquid separation. Then, the separated crude halon reaches a portion above the liquid level of the first absorbing liquid 12 in the first absorbing tower 11, and then is sent to the second absorbing tower 13 via connecting piping 17 connecting the top of the first absorbing tower 11 and the second absorbing tower 13.

The second absorbing tower 13 houses a second absorbing liquid 14. A downstream side end part of the connecting pipe 17 is inserted into the second absorbing liquid 14. Therefore, the crude halon sent from the first absorbing tower 11 is supplied into the second absorbing liquid 14 of the second absorbing tower 13 and contacts the second absorbing liquid 14, so that further purification treatment of the crude halon is performed in the second absorbing tower 13. The first absorbing liquid 12 and the second absorbing liquid 14 may be the same type of absorbing liquid or different types of absorbing liquids.

Although most of the bromine molecules have been removed from the crude halon in the first absorbing tower 11, a slight amount of the remaining bromine molecules is removed from the crude halon in the second absorbing tower 13. Thus, high purity purified halon is obtained. The purified halon is separated from the second absorbing liquid 14 and reaches a portion above the liquid level of the second absorbing liquid 14 in the second absorbing tower 13. At the top of the second absorbing tower 13, exhaust piping 18 for discharging an internal gas is provided, so that the high purity purified halon is discharged to the outside via the exhaust piping 18 from the second absorbing tower 13.

[Purification Treatment Conditions]

The temperature condition in the contact step is not particularly limited. Although the higher the temperature, the faster the speed of the reaction of removing the bromine molecules, an excessively high temperature poses a risk of corrosion of members (for example, piping) of the purification treatment equipment. Therefore, the temperature is preferably set to 5° C. or more and 80° C. or less, more preferably set to 10° C. or more and 60° C. or less, and still more preferably set to 20° C. or more and 60° C. or less. The temperature condition of the contact step, i.e., the temperature of the absorbing liquid, can be controlled by a heating device or a cooling device provided in the absorbing tower housing the absorbing liquid, for example.

The pressure condition of the contact step is not particularly limited and is preferably set to 0 MPa or more and 0.2 MPa or less, more preferably set to 0.1 MPa or more and 0.2 MPa or less, and still more preferably set to normal pressure (0.1 MPa).

EXAMPLES

The present invention is more specifically described with reference to Examples and Comparative Examples described below.

Example 1

Using purification treatment equipment having the same configuration as that of the purification treatment equipment illustrated in the FIGURE, purification treatment of removing bromine molecules from crude dibromodifluoromethane containing dibromodifluoromethane and bromine molecules (equivalent to the "crude halon" which is the constituent requirement of the present invention, hereinafter referred to as "crude halon") to obtain purified dibromodifluoromethane (hereinafter referred to as "purified halon") was performed. The concentration of the bromine molecules in the crude halon was 48.0% by volume as measured using an ion chromatograph manufactured by Shimadzu Corporation.

This purification treatment equipment includes two absorbing towers formed of Teflon (registered trademark) PFA (tetrafluoroethylene-perfluoroalkoxyethylene copolymer), and both the absorbing towers house 1 L of absorbing liquids having the same composition. This absorbing liquid is an aqueous solution of potassium iodide which is a reducing agent. The potassium iodide has a concentration of 1.2 mol/L and has a pH of 7. Both a first absorbing tower on the upstream side and a second absorbing tower on the downstream side each include a temperature control device controlling the temperature of the absorbing liquid. The temperatures of the absorbing liquids housed in the absorbing towers are maintained at 25° C. (Fluctuation of ±2.5° C.) during the purification treatment.

The crude halon filled in a crude halon cylinder was sent to crude halon supply piping using a mass flow controller (mass flow controller SEC-N112MGMW manufactured by Horiba, Ltd.) provided in a crude halon supply unit. A nitrogen gas filled in an inert gas cylinder was sent to the crude halon supply piping via inert gas supply piping using a mass flow controller (mass flow controller SEC-N112MGMW manufactured by Horiba, Ltd.) provided in an inert gas supply unit. Thus, the crude halon and the nitrogen gas were mixed in the crude halon supply piping, and the crude halon was diluted. The mixing ratio is 80% by volume of the crude halon and 20% by volume of the nitrogen gas.

The crude halon diluted with the nitrogen gas was supplied to the first absorbing tower on the upstream side via the crude halon supply piping to bring the crude halon into contact with the absorbing liquid in the first absorbing tower, and the bromine molecules in the crude halon were absorbed into the absorbing liquid. Subsequently, the crude halon from the first absorbing tower was supplied to the second absorbing tower on the downstream side through the connecting pipe to bring the crude halon into contact with the absorbing liquid in the second absorbing tower, and the bromine molecules in the crude halon were absorbed into the absorbing liquid. As a result of performing the crude halon purification treatment as described above, the bromine molecules were removed from the crude halon and purified halon was obtained. The potassium iodide concentrations of the first and second absorbing liquids during the purification treatment period were maintained at 0.72 mol/L or more (i.e., 60% or more of the initial concentration).

The gas discharged from the second absorbing tower on the downstream side was a mixed gas of the purified halon and the nitrogen gas, and therefore the nitrogen gas was removed from this mixed gas, so that the purified halon was obtained. A method for removing the nitrogen gas is not particularly limited. In this Example, the mixed gas was introduced into a cooling trap cooled with dry ice, and the purified halon was liquefied in the cooling trap, so that the nitrogen gas was removed from the mixed gas and the purified halon was obtained. The concentration of the bromine molecules in the purified halon obtained by removing the nitrogen gas from the mixed gas was 0.0188% by volume as measured by an ion chromatograph manufactured by Shimadzu Corporation.

The removal rate of the bromine molecules by the purification treatment was calculated according to the following expression.

Removal rate (%)=[1−[Concentration of bromine molecules in purified halon]/[Concentration of bromine molecules in crude halon]]×100

The results are shown in Table 1. The removal rate of the bromine molecules by the purification treatment was 99.96%, and the bromine molecules were able to be removed to a low concentration where the corrosiveness hardly develops.

TABLE 1

| | | First and second absorbing liquids | | | Total amount of reducing agents of first and second absorbing liquids (mol) | Total amount of bromine molecules (mol) | Concentration of bromine molecules | | Removal rate of bromine molecules (%) |
| | | | | | | | Crude halon (% by volume) | Purified halon (% by volume) | |
| | Halon | Reducing agent | Additive | Temperature (° C.) | | | | | |
|---|---|---|---|---|---|---|---|---|---|
| Ex. 1 | Dibromodifluoromethane | Potassium iodide | — | 25 | 2.40 | 0.240 | 48.0 | 0.0188 | 99.96 |

TABLE 1-continued

| | Halon | First and second absorbing liquids | | | Total amount of reducing agents of first and second absorbing liquids (mol) | Total amount of bromine molecules (mol) | Concentration of bromine molecules | | Removal rate of bromine molecules (%) |
|---|---|---|---|---|---|---|---|---|---|
| | | Reducing agent | Additive | Temperature (° C.) | | | Crude halon (% by volume) | Purified halon (% by volume) | |
| Ex. 2 | Dibromodifluoromethane | Sodium iodide | — | 25 | 2.40 | 0.240 | 48.0 | 0.0353 | 99.93 |
| Ex. 3 | Dibromodifluoromethane | Calcium iodide | — | 25 | 2.40 | 0.240 | 48.0 | 0.0382 | 99.92 |
| Ex. 4 | Dibromodifluoromethane | Magnesium iodide | — | 25 | 2.40 | 0.240 | 48.0 | 0.0396 | 99.92 |
| Ex. 5 | Dibromodifluoromethane | Potassium iodide | — | 25 | 2.40 | 0.163 | 32.6 | 0.0123 | 99.96 |
| Ex. 6 | Dibromodifluoromethane | Potassium iodide | — | 25 | 2.40 | 0.0566 | 11.3 | 0.00392 | 99.97 |
| Ex. 7 | Dibromodifluoromethane | Potassium iodide | — | 45 | 2.40 | 0.240 | 48.0 | 0.00520 | 99.99 |
| Ex. 8 | Dibromodifluoromethane | Potassium iodide | — | 5 | 2.40 | 0.240 | 48.0 | 0.0331 | 99.93 |
| Ex. 9 | Bromodifluoromethane | Potassium iodide | — | 25 | 2.40 | 0.240 | 48.0 | 0.0182 | 99.96 |
| Ex. 10 | Bromodifluoromethane | Potassium iodide | — | 25 | 2.40 | 0.240 | 48.0 | 0.0191 | 99.96 |
| Ex. 11 | Dibromodifluoromethane | Potassium iodide | Potassium iodate (Only first absorbing liquid) | 25 | 2.40 | 0.163 | 32.6 | 0.0141 | 99.96 |
| Comp. Ex. 1 | Dibromodifluoromethane | Sodium sulfite | — | 25 | 2.40 | 0.240 | 48.0 | 0.546 | 98.86 |
| Comp. Ex. 2 | Dibromodifluoromethane | Sodium formate | — | 25 | 2.40 | 0.240 | 48.0 | 0.638 | 98.67 |
| Comp. Ex. 3 | Dibromodifluoromethane | Urea | — | 25 | 2.40 | 0.240 | 48.0 | 0.902 | 98.12 |
| Comp. Ex. 4 | Dibromodifluoromethane | — | — | 25 | — | 0.240 | 48.0 | 16.2 | 66.30 |

Example 2

The crude halon purification treatment was performed in the same manner as in Example 1, except for setting the type of the absorbing liquids housed in the two absorbing towers to an aqueous sodium iodide solution having a concentration of 1.2 mol/L. The pH of the absorbing liquid was 7. The results are shown in Table 1. The removal rate of the bromine molecules by the purification treatment was 99.93%, and the bromine molecules were able to be removed to a low concentration where the corrosiveness hardly develops.

Example 3

The crude halon purification treatment was performed in the same manner as in Example 1, except for setting the type of the absorbing liquids housed in the two absorbing towers to an aqueous calcium iodide solution having a concentration of 1.2 mol/L. The pH of the absorbing liquid was 7. The results are shown in Table 1. The removal rate of the bromine molecules by the purification treatment was 99.92%, and the bromine molecules were able to be removed to a low concentration where the corrosiveness hardly develops.

Example 4

The crude halon purification treatment was performed in the same manner as in Example 1, except for setting the type of the absorbing liquids housed in the two absorbing towers to an aqueous magnesium iodide solution having a concentration of 1.2 mol/L. The pH of the absorbing liquid was 7. The results are shown in Table 1. The removal rate of the bromine molecules by the purification treatment was 99.92%, and the bromine molecules were able to be removed to a low concentration where the corrosiveness hardly develops.

Example 5

The crude halon purification treatment was performed in the same manner as in Example 1, except that the concentration of the bromine molecules in the crude halon was 32.6% by volume. The results are shown in Table 1. The removal rate of the bromine molecules by the purification treatment was 99.96%, and the bromine molecules were able to be removed to a low concentration where the corrosiveness hardly develops.

Example 6

The crude halon purification treatment was performed in the same manner as in Example 1, except that the concentration of the bromine molecules in the crude halon was 11.3% by volume. The results are shown in Table 1. The removal rate of the bromine molecules by the purification treatment was 99.97%, and the bromine molecules were able to be removed to a low concentration where the corrosiveness hardly develops.

Example 7

The crude halon purification treatment was performed in the same manner as in Example 1, except that the temperature during the purification treatment of the absorbing liquid housed in the first absorbing tower on the upstream side was maintained at 45° C. (Fluctuation of ±2.5° C.). The pH of the absorbing liquid was 7. The results are shown in Table 1. The removal rate of the bromine molecules by the purification treatment was 99.99%, and the bromine molecules were able to be removed to a low concentration where the corrosiveness hardly develops.

Example 8

The crude halon purification treatment was performed in the same manner as in Example 1, except that the temperature during the purification treatment of the absorbing liquid housed in the first absorbing tower on the upstream side was maintained at 5° C. (Fluctuation of ±2.5° C.). The pH of the absorbing liquid was 7. The results are shown in Table 1. The removal rate of the bromine molecules by the purification treatment was 99.93%, and the bromine molecules were able to be removed to a low concentration where the corrosiveness hardly develops.

Example 9

The crude halon purification treatment was performed in the same manner as in Example 1, except for using crude bromodifluoromethane containing bromodifluoromethane and bromine molecules as the crude halon. The results are shown in Table 1. The removal rate of the bromine molecules by the purification treatment was 99.96%, and the bromine molecules were able to be removed to a low concentration where the corrosiveness hardly develops.

Example 10

The crude halon purification treatment was performed in the same manner as in Example 1, except for using crude bromotrifluoroethylene containing bromotrifluoroethylene and bromine molecules as the crude halon. The results are shown in Table 1. The removal rate of the bromine molecules by the purification treatment was 99.96%, and the bromine molecules were able to be removed to a low concentration where the corrosiveness hardly develops.

Comparative Example 1

The crude halon purification treatment was performed in the same manner as in Example 1, except for setting the type of the absorbing liquids housed in the two absorbing towers to an aqueous sodium sulfite ($Na_2SO_3$) solution having a concentration of 1.2 mol/L. The results are shown in Table 1. The removal rate of the bromine molecules by the purification treatment was 98.86%. The removal rate of the bromine molecules was lower than that in the case of using the aqueous potassium iodide solution as the absorbing liquid.

Comparative Example 2

The crude halon purification treatment was performed in the same manner as in Example 1, except for setting the type of the absorbing liquids housed in the two absorbing towers to an aqueous sodium formate (HCOONa) solution having a concentration of 1.2 mol/L. The results are shown in Table 1. The removal rate of the bromine molecules by the purification treatment was 98.67%. The removal rate of the bromine molecules was lower than that in the case of using the aqueous potassium iodide solution as the absorbing liquid.

Comparative Example 3

The crude halon purification treatment was performed in the same manner as in Example 1, except for setting the type of the absorbing liquids housed in the two absorbing towers to an aqueous urea (($NH_2)_2CO$) solution having a concentration of 1.2 mol/L. The results are shown in Table 1. The removal rate of the bromine molecules by the purification treatment was 98.12%. The removal rate of the bromine molecules was lower than that in the case of using the aqueous potassium iodide solution as the absorbing liquid.

Comparative Example 4

The crude halon purification treatment was performed in the same manner as in Example 1, except for setting the type of the absorbing liquids housed in the two absorbing towers to water ($H_2O$). The results are shown in Table 1. The removal rate of the bromine molecules by the purification treatment was 66.30%. The removal rate of the bromine molecules was lower than that in the case of using the aqueous potassium iodide solution as the absorbing liquid.

Example 11

Crude dibromodifluoromethane containing dibromodifluoromethane, bromine molecules, and hydrogen bromide was used as the crude halon. The concentration of the bromine molecules in the crude halon was 32.6% by volume as measured using an ion chromatograph manufactured by Shimadzu Corporation. The concentration of the hydrogen bromide in the crude halon was 15.4% by volume as measured by titration using an aqueous sodium hydroxide (NaOH) solution having a concentration of 0.05 mol/L.

The type of the absorbing liquid housed in the first absorbing tower was set to an aqueous solution in which potassium iodide and potassium iodate were dissolved in water. The aqueous solution has the potassium iodide concentration of 1.2 mol/L and has the potassium iodate concentration of 0.0934 mol/L.

The crude halon purification treatment was performed in the same manner as in Example 1, except for the two points above, and the bromine molecules and the hydrogen bromide in the crude halon were removed.

The removal rate of the hydrogen bromide by the purification treatment was calculated according to the following expression.

Removal rate (%)=[1−[Concentration of hydrogen bromide in purified halon]/[Concentration of hydrogen bromide in crude halon]]×100

The results are shown in Tables 1, 2. The removal rate of the bromine molecules by the purification treatment was 99.96%, and the bromine molecules were able to be removed to a low concentration where the corrosiveness hardly develops. The concentration of the hydrogen bromide in the crude halon was 0.00227% by volume as measured by titration using an aqueous sodium hydroxide solution having a concentration of 0.05 mol/L, and the removal rate of the hydrogen bromide by the purification treatment was 99.99%.

TABLE 2

| | Halon | First and second absorbing liquids | | | Total amount of reducing agents of first and second absorbing liquids (mol) | Total amount of additive (mol) | Total amount of hydrogen bromide (mol) | Concentration of hydrogen bromide | | Removal rate of hydrogen bromide (%) |
|---|---|---|---|---|---|---|---|---|---|---|
| | | Reducing agent | Additive | Temperature (°C.) | | | | Crude halon (% by volume) | Purified halon (% by volume) | |
| Ex. 11 | Dibromodifluoromethane | Potassium iodide | Potassium iodate (Only first absorbing liquid) | 25 | 2.40 | 0.0934 | 0.0770 | 15.4 | 0.00227 | 99.99 |

REFERENCE SIGNS LIST 1 crude halon cylinder
2 inert gas cylinder
3 crude halon supply unit
4 inert gas supply unit
11 first absorbing tower
12 first absorbing liquid
13 second absorbing tower
14 second absorbing liquid

The invention claimed is:

1. A halon purification method for removing bromine molecules from crude halon containing halon and the bromine molecules, the method comprising:
   a contact step of bringing the crude halon into contact with an absorbing liquid containing an aqueous solution containing metal iodide to obtain a mixed liquid containing the crude halon and the absorbing liquid; and
   a separation step of separating the halon from the mixed liquid to obtain the halon and the absorbing liquid having absorbed the bromine molecules.

2. The halon purification method according to claim 1, wherein the metal iodide is at least one selected from alkali metal iodides and alkaline earth metal iodides.

3. The halon purification method according to claim 1, wherein the metal iodide is potassium iodide.

4. The halon purification method according to claim 1, wherein
   the crude halon in a gaseous state is brought into contact with the absorbing liquid in the contact step, and
   the halon in a gaseous state is extracted from the mixed liquid by gas-liquid extraction in the separation step.

5. The halon purification method according to claim 1, wherein a number of carbons of the halon is 1 or more and 3 or less.

6. The halon purification method according to claim 1, wherein a number of carbons of halon is 1 or 2.

7. The halon purification method according to claim 1, wherein the halon is at least one of bromomethane, tribromofluoromethane, bromodifluoromethane, dibromodifluoromethane, bromotrifluoromethane, bromoethane, dibromotrifluoroethane, dibromotetrafluoroethane, tribromotrifluoroethane, bromofluoroethylene, bromodifluoroethylene, and bromotrifluoroethylene.

8. The halon purification method according to claim 1, wherein the absorbing liquid further contains potassium iodate or sodium iodate.

9. The halon purification method according to claim 2, wherein
   the crude halon in a gaseous state is brought into contact with the absorbing liquid in the contact step, and
   the halon in a gaseous state is extracted from the mixed liquid by gas-liquid extraction in the separation step.

10. The halon purification method according to claim 3, wherein
   the crude halon in a gaseous state is brought into contact with the absorbing liquid in the contact step, and
   the halon in a gaseous state is extracted from the mixed liquid by gas-liquid extraction in the separation step.

11. The halon purification method according to claim 2, wherein a number of carbons of the halon is 1 or more and 3 or less.

12. The halon purification method according to claim 3, wherein a number of carbons of the halon is 1 or more and 3 or less.

13. The halon purification method according to claim 4, wherein a number of carbons of the halon is 1 or more and 3 or less.

14. The halon purification method according to claim 2, wherein a number of carbons of halon is 1 or 2.

15. The halon purification method according to claim 3, wherein a number of carbons of halon is 1 or 2.

16. The halon purification method according to claim 4, wherein a number of carbons of halon is 1 or 2.

17. The halon purification method according to claim 2, wherein the halon is at least one of bromomethane, tribromofluoromethane, bromodifluoromethane, dibromodifluoromethane, bromotrifluoromethane, bromoethane, dibromotrifluoroethane, dibromotetrafluoroethane, tribromotrifluoroethane, bromofluoroethylene, bromodifluoroethylene, and bromotrifluoroethylene.

18. The halon purification method according to claim 3, wherein the halon is at least one of bromomethane, tribromofluoromethane, bromodifluoromethane, dibromodifluoromethane, bromotrifluoromethane, bromoethane, dibromotrifluoroethane, dibromotetrafluoroethane, tribromotrifluoroethane, bromofluoroethylene, bromodifluoroethylene, and bromotrifluoroethylene.

19. The halon purification method according to claim 4, wherein the halon is at least one of bromomethane, tribromofluoromethane, bromodifluoromethane, dibromodifluoromethane, bromotrifluoromethane, bromoethane, dibromotrifluoroethane, dibromotetrafluoroethane, tribromotrifluoroethane, bromofluoroethylene, bromodifluoroethylene, and bromotrifluoroethylene.

20. The halon purification method according to claim 2, wherein the absorbing liquid further contains potassium iodate or sodium iodate.

\* \* \* \* \*